J. I. SCHERMERHORN.
Devices for Rounding the Ends of Bolts.
No. 144,569. Patented Nov. 11, 1873.
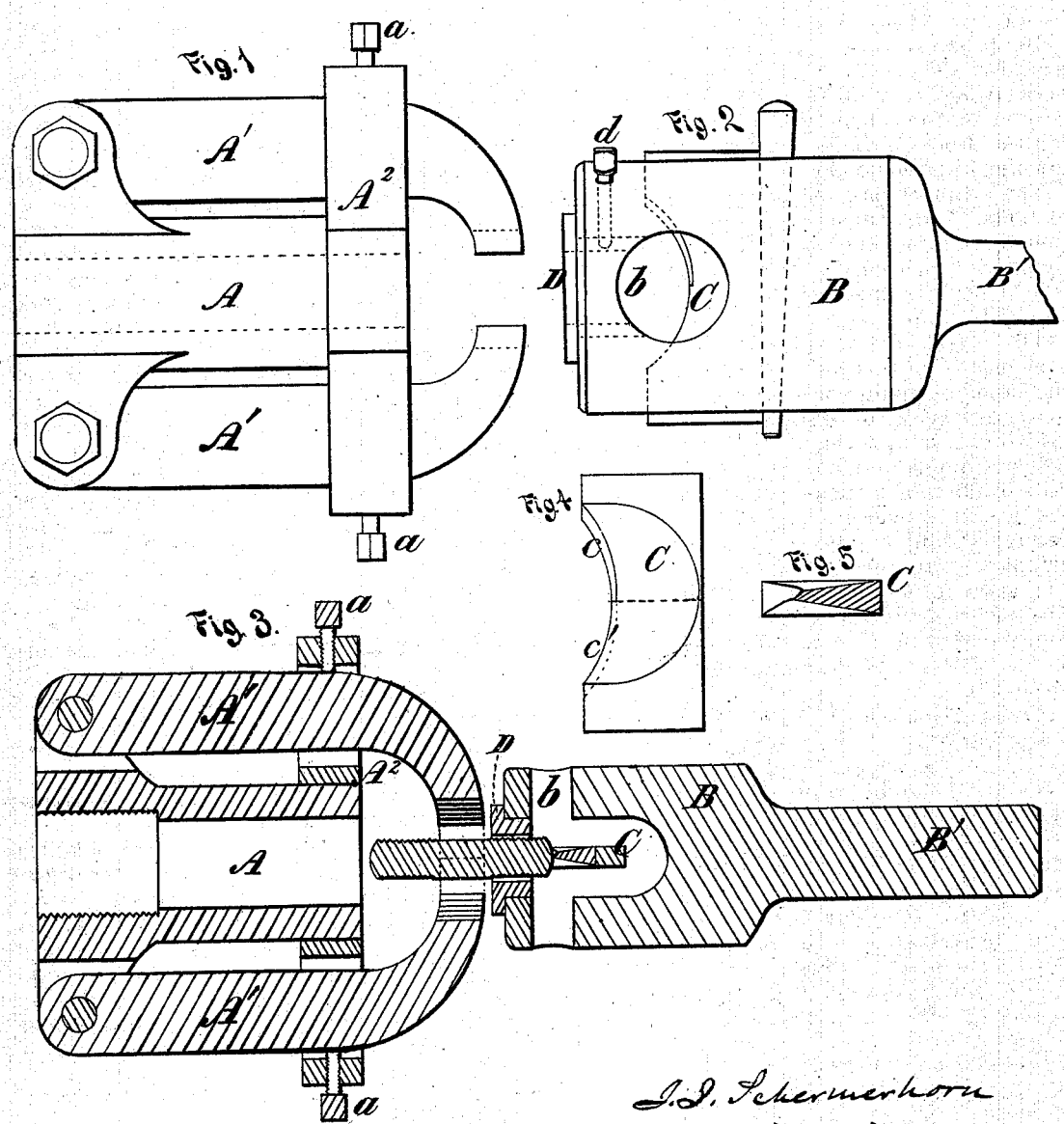

UNITED STATES PATENT OFFICE.

JAMES I. SCHERMERHORN, OF SCHENECTADY, NEW YORK.

IMPROVEMENT IN DEVICES FOR ROUNDING THE ENDS OF BOLTS.

Specification forming part of Letters Patent No. 144,569, dated November 11, 1873; application filed August 30, 1873.

*To all whom it may concern:*

Be it known that I, JAMES I. SCHERMERHORN, of Schenectady, in the county of Schenectady and State of New York, have invented certain Improvements in Machines for Rounding the Ends of Bolts, &c., of which the following is a specification:

The ordinary manner of rounding the ends of bolts, studs, set-screws, &c., by centering them on a lathe, and then dressing the ends by hand, is not only a tedious process, but it is also next to impossible thus to shape any two ends alike.

The object of my invention is to provide such means for this purpose as will both lessen the labor of manipulation and turn out uniform work; and to this end it consists in the use with a suitable chuck, which centers the bolt by simply clamping it between a pair of jaws or dogs, of a cutter-head, which encircles the projecting end of the bolt with a snugly-fitting bearing, and carries a concave cutter, arranged transversely in rear of the bearing in a plane intersecting the axial line thereof. The cutter, having reverse cutting-edges from the center outward, trims or rounds the ends of the bolts or studs with unvarying uniformity.

Figure 1 is a plan view of the chuck. Fig. 2 is a plan view of the cutter-head. Fig. 3 is a longitudinal section, showing the manner of rounding the end of a bolt. Figs. 4 and 5 are views of the cutter.

The same letters of reference are used in all the figures in the designation of identical parts.

The chuck is composed of a tubular head, A, and two clamping arms or dogs, A' A', which are pivoted to the head upon opposite sides thereof, and whose hook-shaped outer ends overhang the end of the head in the manner clearly shown. These dogs pass through elongated slots in a cross-bar, $A^2$, of the head, and they can be forced toward each other to clamp a bolt or stud between them by set-screws *a a*. The head has an internal screw-thread, so that it can be screwed upon the mandrel of a lathe. The cutter-head B, illustrated in the drawing, is provided with a stem, B', to secure it in the tool-post of the lathe. The cutter or bit C, a flat piece of steel with concave reverse cutting-edges *c* and *c'*, is placed transversely in the head B, so that the line dividing the cutting-edges will coincide with the axis of the cutter-head, which is provided with an axial cavity spanned by the cutter. The latter may be secured by a key, or in any other preferred manner. The projecting end of the bolt or stud to be trimmed passes into the axial cavity in the cutter-head through a sleeve-bearing, D, inserted in the outer end of the cavity, and snugly fitting the bolt or stud. A set of sleeves will accompany each cutter-head to fit different sizes of bolts and studs, &c. The sleeve is secured by a set-screw, *d*. A transverse aperture, *b*, is formed in the cutter-head, through which the chips are discharged. Different cutters with cutting-edges of varying outlines can be used to give any desired convexity to the ends of different bolts, and the cutters may be made in two halves, as indicated by the broken line in Fig. 4.

As described, the chuck and bolt are made to turn, while the cutter-head is held stationary; this arrangement may be reversed. I also wish it to be understood that I do not confine myself to the use of the particular chuck shown, as many others now known may be employed with equal advantage.

What I claim as my invention, and desire to secure by Letters Patent, is—

A mechanism for rounding the ends of bolts, studs, &c., composed of a suitable chuck for clamping the bolt, and a transversely-perforated cutter-head, B *b*, which supports the projecting end of the bolt in a removable and exchangeable sleeve-bearing, D, and carries a concave cutter, C, substantially as specified.

In testimony whereof I have signed my name to this specification in the presence of two subscribing witnesses.

JAMES I. SCHERMERHORN.

Witnesses:
RANSLER BRINTON,
HENRY B. HOUSTON.